(12) United States Patent
Okuno et al.

(10) Patent No.: US 7,912,323 B2
(45) Date of Patent: Mar. 22, 2011

(54) IMAGE PROCESSING APPARATUS, IMAGE PROCESSING METHOD, AND IMAGE DISPLAY APPARATUS

(75) Inventors: Yoshiaki Okuno, Tokyo (JP); Akihiro Nagase, Tokyo (JP); Jun Someya, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1145 days.

(21) Appl. No.: 11/628,305

(22) PCT Filed: Nov. 11, 2005

(86) PCT No.: PCT/JP2005/020706
§ 371 (c)(1),
(2), (4) Date: Dec. 1, 2006

(87) PCT Pub. No.: WO2006/090515
PCT Pub. Date: Aug. 31, 2006

(65) Prior Publication Data
US 2008/0050032 A1 Feb. 28, 2008

(30) Foreign Application Priority Data

Feb. 22, 2005 (JP) ................................. 2005-045864

(51) Int. Cl.
*G06K 9/18* (2006.01)
*G06K 9/46* (2006.01)
*G06K 9/66* (2006.01)
*G06K 9/40* (2006.01)
*G06K 1/00* (2006.01)
*H04N 9/47* (2006.01)
*H04N 7/18* (2006.01)
*H04N 5/262* (2006.01)
*H04N 9/74* (2006.01)
*H04N 1/393* (2006.01)
*H04N 1/46* (2006.01)
*G06F 15/00* (2006.01)
*G06F 15/02* (2006.01)

(52) U.S. Cl. ........ 382/300; 382/182; 382/195; 382/266; 382/275; 348/63; 348/240.99; 348/240.2; 348/581; 358/1.2; 358/451; 358/525

(58) Field of Classification Search .................. 382/254, 382/256, 260, 263, 266, 268, 275, 293, 298–300; 358/1.16, 3.24, 501, 1.2, 451, 525; 348/63, 348/240.99, 240.2, 580–582
See application file for complete search history.

(56) References Cited

U.S. PATENT DOCUMENTS

2002/0030690 A1* 3/2002 Someya et al. ............... 345/598
(Continued)

FOREIGN PATENT DOCUMENTS

JP 2000-101870 A 4/2000
(Continued)

OTHER PUBLICATIONS

Okuno et al., "Image Processing Device, Image Display Device, Image Processing Method, and Image Display Method", WO2004/057354, PCT/JP03/13726, PCT Pub. Date Jul. 8, 2004.*

*Primary Examiner* — Vu Le
*Assistant Examiner* — Nathan Bloom
(74) *Attorney, Agent, or Firm* — Birch, Stewart, Kolasch and Birch, LLP

(57) ABSTRACT

A first edge width correction process (2) is carried out in which edge widths are corrected by an interpolation process using zoom ratio control values (RZC) generated according to the edge widths in image data; an enlargement processing process (3) that enlarges the image data with edge widths corrected by the first edge width correction process (2) is carried out; a second edge width correction process (4) similar to the first edge width correction process is carried out on the enlarged image data; and an edge enhancement process that enhances edges in the image data with edge widths corrected by the second edge width correction process is carried out. An image processing apparatus is obtained that mitigates the loss of sharpness in an enlarged image and accordingly makes it possible to provide better picture quality.

6 Claims, 14 Drawing Sheets

U.S. PATENT DOCUMENTS

| | | | |
|---|---|---|---|
| 2003/0053087 A1* | 3/2003 | Sekizawa et al. | 358/1.9 |
| 2003/0210804 A1* | 11/2003 | Rhoads | 382/100 |
| 2005/0180658 A1* | 8/2005 | Curry et al. | 382/300 |
| 2006/0045375 A1* | 3/2006 | Okuno et al. | 382/266 |
| 2008/0043145 A1* | 2/2008 | Someya et al. | 348/538 |
| 2009/0324079 A1* | 12/2009 | Yuan et al. | 382/176 |

FOREIGN PATENT DOCUMENTS

| | | |
|---|---|---|
| JP | 2000-137469 A | 5/2000 |
| JP | 2002-010070 A | 1/2002 |
| JP | 2002-215130 A | 7/2002 |
| JP | 2003-008889 A | 1/2003 |

* cited by examiner

IMAGE PROCESSING APPARATUS, IMAGE PROCESSING METHOD, AND IMAGE DISPLAY APPARATUS

FIELD OF THE INVENTION

The present invention relates to an image processing apparatus and an image processing method for enhancing edges in a digital image to a desired sharpness, an image processing apparatus and an image processing method for enhancing edges in a digital image to a desired sharpness and enlarging the image by an arbitrary zoom ratio, an image display apparatus using these types of image processing apparatuses, and an image display method using these types of image processing methods.

BACKGROUND ART

Image processing methods for improving the sharpness of an image by modifying edges in the image are disclosed in the Patent Documents listed below. In the image processing method disclosed in Patent Document 1, when the number of pixels of an input image is converted, a control value generated according to the high frequency components of the image signal is used to control the interpolation phase in the interpolation filter used for changing the number of pixels. Such control of the interpolation phase according to high frequency components produces sharper transitions at edges in the image, resulting in a crisper image.

The image processing method disclosed in Patent Document 2 enlarges an image, and then enhances edges by an amount responsive to the zoom ratio. This enhancement of the edges in an image after enlargement of the image prevents a reduction in edge sharpness due to the enlargement.

Patent Document 1: Japanese Patent Application Publication No. 2000-101870 (p. 3, FIG. 1)
Patent Document 2: Japanese Patent Application Publication No. 2000-137469 (p. 3, FIG. 1)

DISCLOSURE OF THE INVENTION

Problems to be Solved by the Invention

A problem with the conventional image processing method described in Patent Document 1 is that because edges are corrected according to high frequency components of an image, it is difficult to improve sharpness at edges at which changes in image signal level are comparatively small, Accordingly, it is difficult to improve the crispness of the whole image without overcorrecting or undercorrecting. Another problem with the conventional image processing method described in Patent Document 2 is that because an edge enhancement process is carried out on an image which has been smoothed by an enlargement process performed on the image, the overshoot and undershoot added at the front and rear of edges have comparatively large widths, so edge sharpness cannot be sufficiently improved.

An object of the present invention is to provide an image processing apparatus and method that mitigate the loss of sharpness in an enlarged image and can accordingly provide improved picture quality.

Means of Solution of the Problems

An image processing apparatus according to the present invention comprises a first edge width correction means for detecting edges in image data, generating first zoom ratio control values according to edge widths of the detected edges, and carrying out an interpolation calculation process on the image data according to the first zoom ratio control values, thereby correcting the edge width;

an enlargement processing means for carrying out an enlargement process on the image data with edge widths corrected by the first edge width correction means;

a second edge width correction means for detecting edges in the image data enlarged by the enlargement processing means, generating second zoom ratio control values according to edge widths of the detected edges, and carrying out an interpolation calculation process on the enlarged image data according to the second zoom ratio control values, thereby correcting the edge widths; and an edge enhancement means for detecting high frequency components of the image data with edge widths corrected by the second edge width correction means, calculating enhancement values for enhancing the edges according to the detected high frequency components, and adding the enhancement values to the image data with edge widths corrected by the second edge width correction means, thereby enhancing the edges.

An image processing method according to the present invention comprises a first edge width correction step for detecting edges in image data, generating first zoom ratio control values according to edge widths of the detected edges, and carrying out an interpolation calculation process on the image data according to the first zoom ratio control values, thereby correcting the edge widths;

an enlargement step for carrying out an enlargement process on the image data with edge widths corrected by the first edge width correction step;

a second edge width correction step for detecting edges in the image data enlarged by the enlargement step, generating second zoom ratio control values according to edge widths of the detected edges, and carrying out an interpolation calculation process on the enlarged image data according to the second zoom ratio control values, thereby correcting the edge widths; and an edge enhancement step for detecting high frequency components of the image data with edge widths corrected by the second edge width correction step, calculating enhancement values for enhancing the edges according to the detected high frequency components, and adding the enhancement values to the image data with edge widths corrected by the second edge width correction step, thereby enhancing the edges.

Effect of the Invention

Since an image processing apparatus according to the present invention corrects edge widths of image data, then carries out an enlargement process on the image data with the corrected edge widths, and corrects the edge widths of the enlarged image data after the enlargement process, edge sharpness can be improved even when the image is enlarged. Because edge widths are corrected before the enlargement process, the edge width correcting process after the enlargement process can be simplified.

Figure 1:
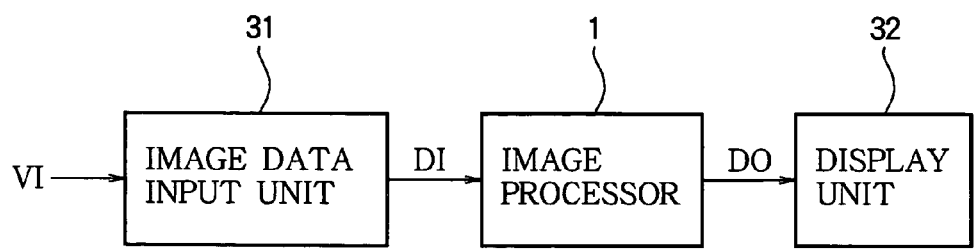
FIG. 1 is a block diagram showing an embodiment of an image processing apparatus according to the present invention.

EXPLANATION OF REFERENCE CHARACTERS 1 image processor, 2 first edge width corrector, 3 enlargement processor, 4 second edge width corrector, 5 edge enhancer, 6 edge width detector, 7 zoom ratio control value generator, 8 zoom ratio generator, 9 interpolation processor, 10 edge detector, 11 edge enhancement value generator, 12 enhancement value adder, 13 vertical edge width corrector, 14 horizontal edge width corrector, 23 vertical edge enhancer, 24 horizontal edge enhancer, 30 horizontal enhancement value adder, 31 image data input unit, 32 display unit

BEST MODE OF PRACTICING THE INVENTION

Embodiments of the invention will now be described with reference to the attached drawings.

FIG. 1 is a drawing showing the structure of an image display apparatus equipped with image processing apparatus according to the present invention. The image display apparatus shown in FIG. 1 comprises an image processor 1, an image data input unit 31, and a display unit 32.

An image signal VI is input to the image data input unit 31. The image signal VI includes an image data signal and a synchronizing signal, from which the image data input unit 31 outputs the image data DI in digital form. If the image signal VI is an analog signal, the image data input unit 31 comprises an analog-to-digital (A/D) converter and outputs image data DI sampled at the rate of the synchronizing signal. If the image signal VI is an encoded digital signal, the image data input unit 31 comprises a decoder and outputs decoded image data DI.

The image data DI output from the image data input unit 31 are input to the image processor 1. The image processor 1 carries out an enlargement process that enlarges the image size of the image data DI according to the display size of the display unit 32, and an edge correcting process that corrects the blurring of edges that occurs due to the enlargement process. Image data DO output from the image processor 1 are input to the display unit 32, and the input image data DO are displayed.

Figure 2:
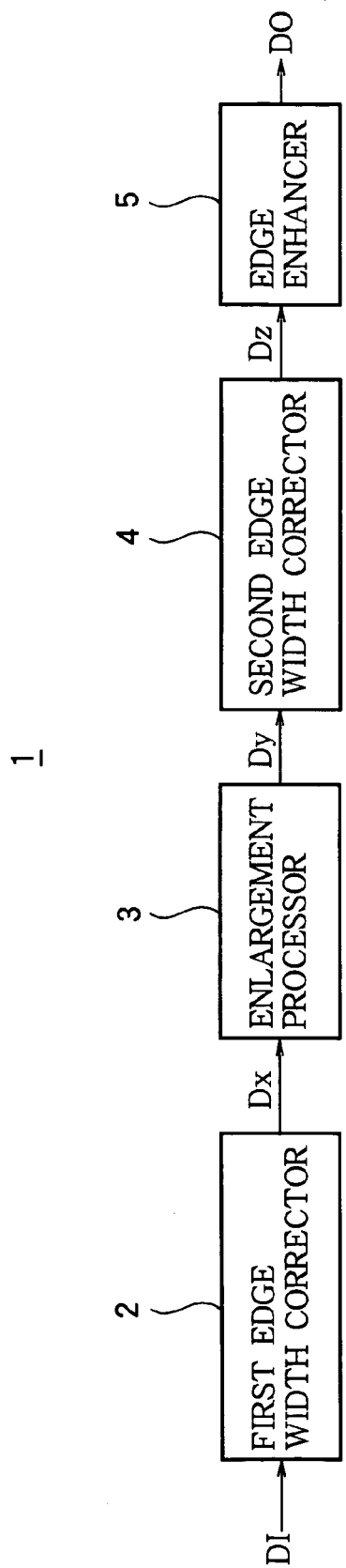
FIG. 2 is a block diagram showing the structure of the image processor.

FIG. 2 is a block diagram showing the internal structure of the image processor 1.

As shown in FIG. 2, the image processor 1 comprises a first edge width corrector 2, an enlargement processor 3, a second edge width corrector 4, and an edge enhancer 5.

Image data DI are input to the first edge width corrector 2. The first edge width corrector 2 carries out an edge width correcting process on the image data DI, and outputs image data Dx with corrected edge widths to the enlargement processor 3. The enlargement processor 3 carries out an enlargement process in the horizontal and vertical directions on the image data Dx output from the first edge width corrector 2, and outputs enlarged image data Dy to the second edge width corrector 4. The second edge width corrector 4 carries out the same edge width correcting process as the first edge width corrector 2 on the enlarged image data Dy output from the enlargement processor 3, and outputs image data Dz with corrected edge widths to the edge enhancer 5. The edge enhancer 5 carries out an edge enhancement process on the image data Dz output from the second edge width corrector 4, and outputs image data DO with enhanced edges.

Figure 3:
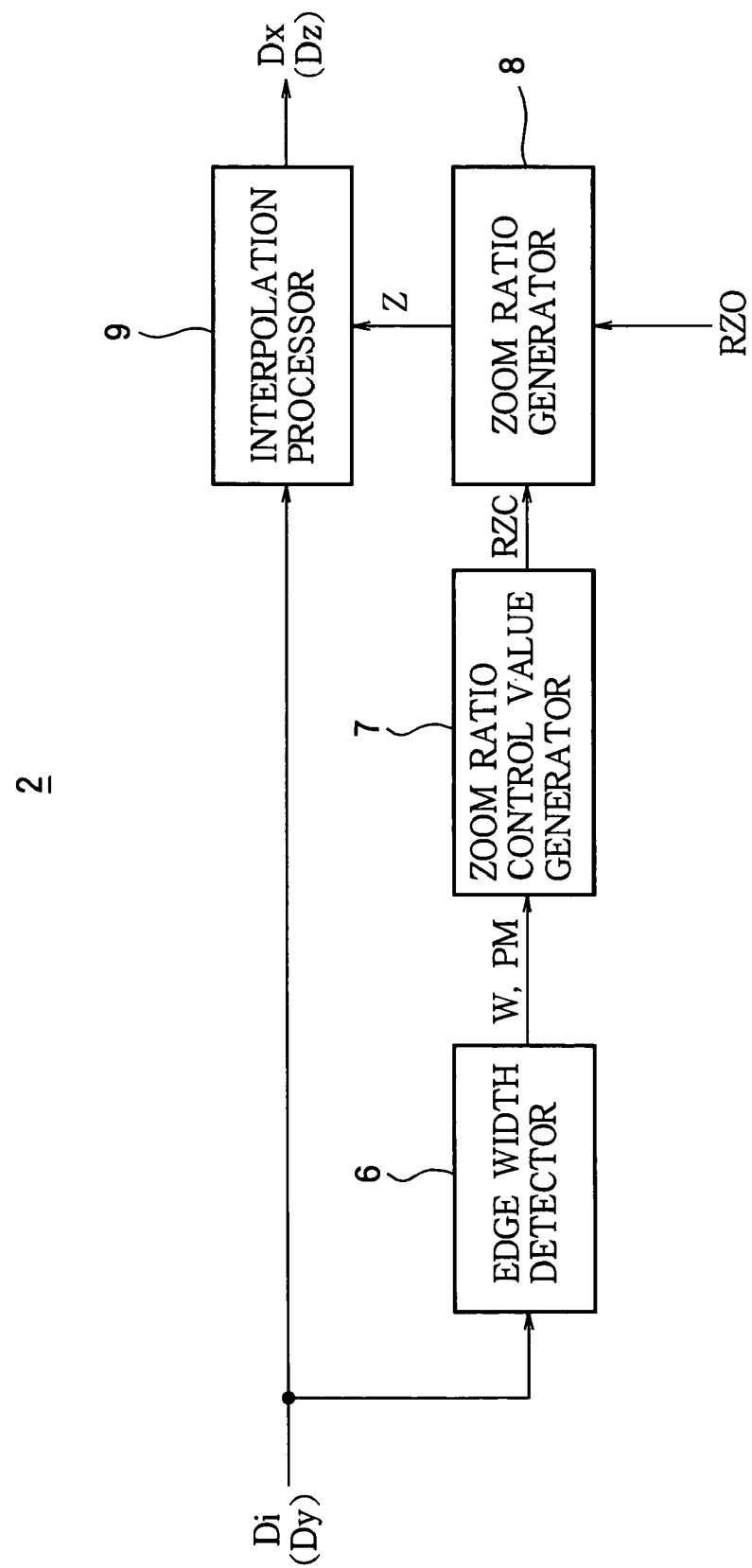
FIG. 3 is a block diagram showing the structure of the first and second edge width correctors.

FIG. 3 is a block diagram showing the internal structure of the first and second edge width correctors 2, 4. The first and second edge width correctors 2, 4 have the same internal structure. Each comprises an edge width detector 6, a zoom ratio control value generator 7, a zoom ratio generator 8, and an interpolation processor 9.

The edge width detector 6 distinguishes edges as parts of the image in which the size of the image data DI varies continuously in the horizontal direction for a predetermined period, detects the width W of each edge (edge width), and detects a predetermined position PM in each edge width as a reference position. The zoom ratio control value generator 7 generates zoom ratio control values RZC to be used in the edge width correcting process according to the edge widths W and edge reference positions PM detected by the edge width detector 6, and sends the generated zoom ratio control values RZC to the zoom ratio generator 8. The zoom ratio control values RZC are used to specify an interpolation zoom ratio (interpolation density) on a pixel-by-pixel basis when pixels are interpolated in an interpolation calculation process (described below) to correct edge widths.

The zoom ratio generator 8 calculates zoom conversion ratio information RZ by superimposing the zoom ratio control value RZC on arbitrary reference zoom conversion ratio information RZ0, and calculates the reciprocal (1/RZ) of the zoom conversion ratio information RZ as a zoom conversion ratio Z. The reference zoom conversion ratio information RZ0 specifies the ratio of the number of pixels in the image data DI before and after the edge width correcting process: if RZ0=1, the number of pixels in the image data DI remains the same before and after the edge width correcting process; if RZ0>1, an enlargement process is performed on the image simultaneously with the edge width correcting process. The interpolation processor 9 carries out an interpolation process on the image data DI by using the zoom conversion ratio Z (=1/RZ) calculated in the zoom ratio generator 8, and calculates interpolation pixel data to correct edges, thereby generating image data Dx with corrected edge widths.

Figure 4A:
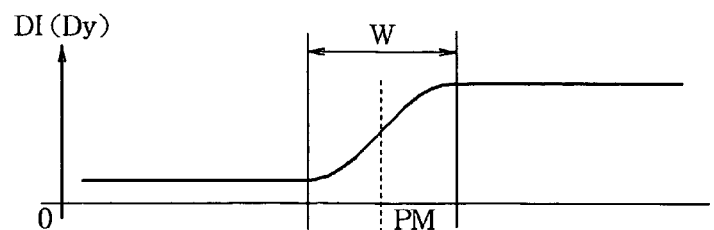
FIGS. 4(a) to 4(e) are graphs illustrating the operation of the edge width correctors.
Figure 4B:
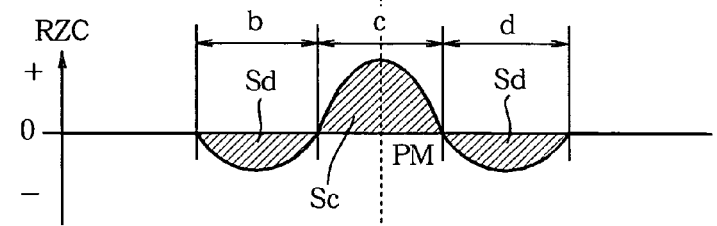
Figure 4C:
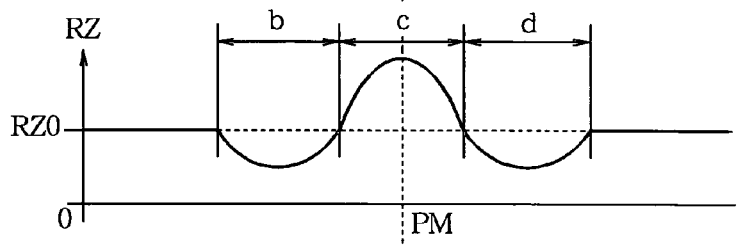
Figure 4D:
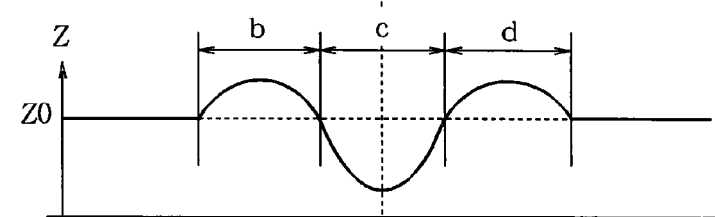
Figure 4E:
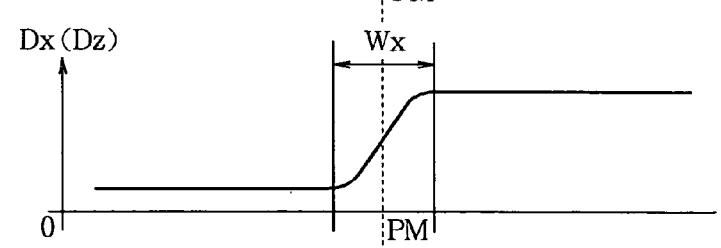

FIGS. 4(a) to 4(e) are graphs illustrating the edge width correction process in the first and second edge width correctors 2, 4. FIG. 4(a) shows the edge width W and a reference position PM in the image data DI (Dy), as detected in the edge width detector 6; FIG. 4(b) shows the zoom ratio control values RZC generated for the edge shown in FIG. 4(a). FIG. 4(c) shows the zoom conversion ratio information RZ calculated by superimposing the zoom ratio control values RZC in FIG. 4(b) on reference zoom conversion ratio information RZ0; FIG. 4(d) shows the zoom conversion ratio Z calculated as the reciprocal (1/RZ) of the zoom conversion ratio information RZ in FIG. 4(c). In FIG. 4(d), Z0 is a reference zoom conversion ratio equal to the reciprocal (1/RZ0) of the reference zoom conversion ratio information RZ0. If the reference zoom conversion ratio is greater than unity (Z0>1), an enlargement process that increases the number of pixels is performed together with the edge width correction process; if the reference zoom conversion ratio is less than unity (Z0<1), a reduction process that reduces the number of pixels is performed. If Z0=1, only the edge width correction process is performed. FIG. 4(e) shows the image data Dx (Dz) with the corrected edge width created by performing the interpolation calculation process on the image data DI shown in FIG. 4(a), using the zoom conversion ratio Z shown in FIG. 4(d).

As shown in FIG. 4(b), the zoom ratio control values RZC are generated so that RZC is negative in the front part (b) and rear part (d) of the edge, positive in the central part (c) of the edge, and zero elsewhere, and so that the RZC values sum to zero over the edge as a whole. The zoom conversion ratio information RZ, which is calculated by superimposing the zoom ratio control values RZC on arbitrary reference zoom conversion ratio information RZ0, therefore averages out to the reference zoom conversion ratio information RZ0, as shown in FIG. 4(c). In the front part (b) and rear part (d) of the edge, in which the value of the zoom conversion ratio information RZ is less than the reference zoom conversion ratio information RZ0, the zoom conversion ratio Z is greater than the reference zoom conversion ratio Z0, as shown in FIG. 4(d). In the central part (c) of the edge, in which the value of the zoom conversion ratio information RZ is greater than the reference zoom conversion ratio information RZ0, the zoom conversion ratio Z is less than the reference zoom conversion ratio Z0, as shown in FIG. 4(d). The zoom conversion ratio Z is thus greater than the reference zoom conversion ratio Z0 in the front part (b) and rear part (d) of the edge and less than the reference zoom conversion ratio Z0 in the edge central part (c) of the edge.

The interpolation processor 9 carries out an interpolation process on the image data DI by using the zoom conversion ratio Z shown in FIG. 4(d), thereby generating image data Dx with corrected edge widths. In the interpolation process, in the front part (b) and rear part (d) of the edge, in which the zoom conversion ratio Z is greater than the reference zoom conversion ratio Z0, the interpolation density is increased; in the central part (c) of the edge, in which the zoom conversion ratio Z is less than the reference zoom conversion ratio Z0, the interpolation density is decreased. Accordingly, an enlargement process that results in a relative increase in the number of pixels is performed in the front part (b) and rear part (d) of the edge, and a reduction process that results in a relative decrease in the number of pixels is performed in the central part (c) of the edge. FIG. 4(e) is a graph illustrating the image data Dx with the corrected edge width. As shown in FIG. 4(e), the image is reduced in the central part (c) and enlarged in the front and rear parts (b and d) of the edge, thereby reducing the edge width W and improving the sharpness of the edge.

The zoom ratio control values RZC are generated according to the edge width W so as to sum to zero over these parts (b, c, and d). This means that if the areas of the hatched sectors in FIG. 4(b) are Sb, Sc, and Sd, respectively, the RZC values are generated so that Sb+Sd=Sc. Accordingly, although the zoom conversion ratio values Z vary locally, the zoom conversion ratio Z of the image as a whole is identical to the reference zoom conversion ratio Z0. As described above, the zoom ratio control values RZC are generated so that the zoom conversion ratio Z of the image as a whole is identical to the reference zoom conversion ratio Z0, thereby correcting the edge width without causing any displacement of the image at the edge.

The corrected value Wx of the edge width W can be arbitrarily set according to the size of the area Sc defined by the zoom ratio control values RZC in the central part (c) in FIG. 4(b). Therefore, the size of area Sc can be adjusted to obtain the desired degree of crispness in the converted image.

Figure 5:
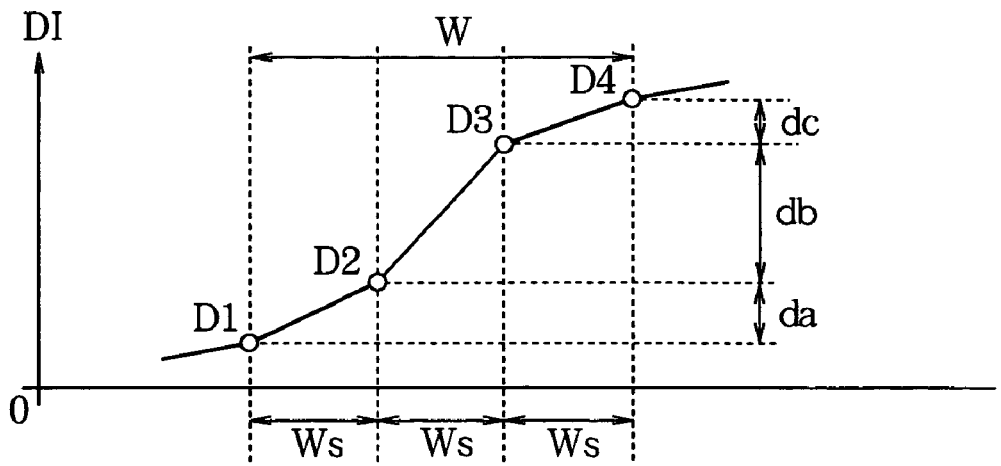
FIG. 5 is a graph illustrating the operation of the edge width detector.

FIG. 5 is a graph illustrating the relationship between the image data DI and the edge width W. Only part of the pixel data (D1, D2, D3, D4) constituting the image data DI is shown. Ws indicates the pixel data spacing (the horizontal sampling period). The difference (da) between pixel data D1 and D2, the difference (db) between pixel data D2 and D3, and the difference (dc) between pixel data D3 and D4 are shown: specifically, da=D2−D1, db=D3−D2, and dc=D4−D3. The differences (da, db, dc) indicate the variations of the pixel data in the front, central, and rear parts of the edge, respectively.

The edge width detector 6 detects a part of the image in which the image data DI increase or decrease monotonically and the front and rear parts are flatter than the central part as an edge according to the values of da, db, and dc. More specifically, when these values (da, db, dc) satisfy both of the following conditions (1a and 1b), the four pixels with the pixel data (D1, D2, D3, D4) shown in FIG. 5 are regarded as an edge, and the space they occupy is output as the edge width W.

$$da \geq 0, db \geq 0, dc > 0 \text{ or}$$

$$da \leq 0, db \leq 0, dc \leq 0 \tag{1a}$$

$$|db| > |da|, |db| > |dc| \tag{1b}$$

In this case the edge width is three times the pixel spacing (W=3×Ws).

From the data for K+1 pixels (where K is a positive integer), it is possible to detect edge widths W up to the product of K and the pixel spacing Ws (W=K×Ws). The edge width may be detected by using pixel data extracted from every other pixel (at intervals of 2×Ws).

The image data Dx with corrected edge widths output from the first edge width corrector 2 are input to the enlargement processor 3 (see FIG. 2). The enlargement processor 3 enlarges the image data Dx with corrected edge widths by a predetermined zoom ratio.

Figure 6A:
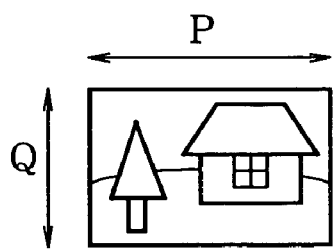
FIGS. 6(a) and 6(b) are drawings illustrating the operation of the enlargement processor.
Figure 6B:
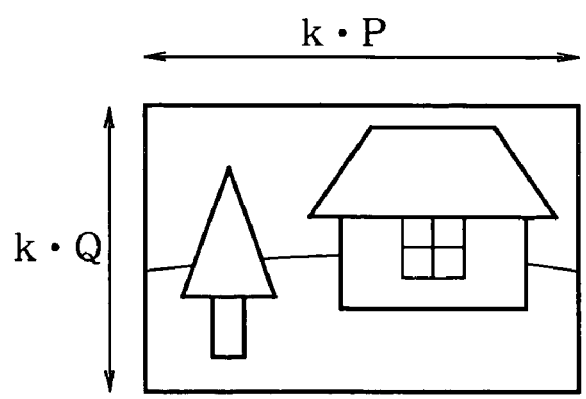

FIGS. 6(a) and 6(b) illustrate the operation of the enlargement processor 3. FIG. 6(a) shows an image before enlargement; FIG. 6(b) shows the enlarged image. Although the image size of the image in FIG. 6(a) is enlarged in both the horizontal and vertical directions by the same zoom ratio (k), different zoom ratios may be set for the horizontal and vertical directions. In these drawings, an image of horizontal size P and vertical size Q is enlarged to a horizontal size of k·P and a vertical size of k·Q.

The enlarged image data Dy output from the enlargement processor 3 are input to the second edge width corrector 4. The second edge width corrector 4 carries out the same edge width correction process as the first edge width corrector 2 on the image data Dy, thereby generating image data Dz with corrected edge widths.

The image data Dz with corrected edge widths output from the second edge width corrector 4 are input to the edge enhancer 5.

Figure 7:
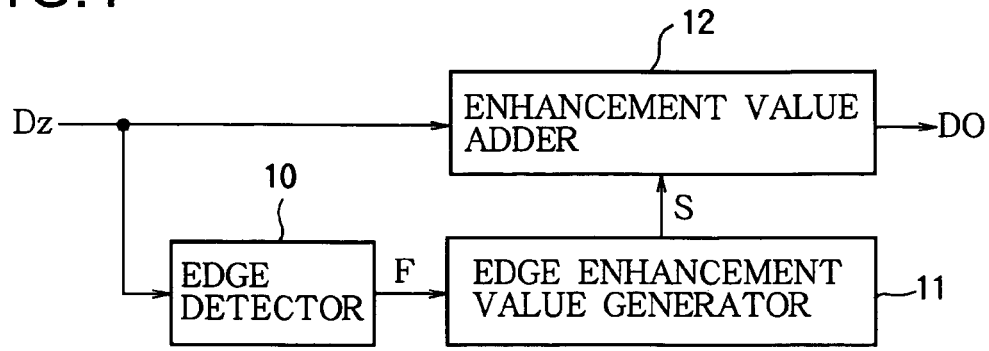
FIG. 7 is a block diagram showing the structure of the edge enhancer.

FIG. 7 is a block diagram showing the structure of the edge enhancer 5. The edge enhancer 5 comprises an edge detector 10, an edge enhancement value generator 11, and an enhancement value adder 12.

The image data Dz with corrected edge widths are input to the edge detector 10 and the enhancement value adder 12. The edge detector 10 performs a differential calculation on the image data Dz, such as taking the second derivative, thereby detecting variation data F indicating the variation of the image data across edges, the widths of which are now denoted Wz. The edge enhancement value generator 11 generates enhancement values S for enhancing edges in the image data Dz according to the variation data F, and supplies the generated enhancement values S to the enhancement value adder 12. The enhancement value adder 12 adds the enhancement values S to the image data Dz, thereby enhancing the edges in the image data Dz and generating image data DO with enhanced edges.

Figure 8A:
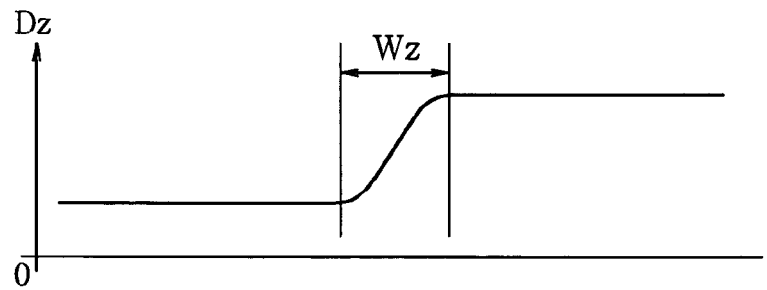
FIGS. 8(a) to 8(d) are graphs illustrating the operation of the edge enhancer.
Figure 8B:
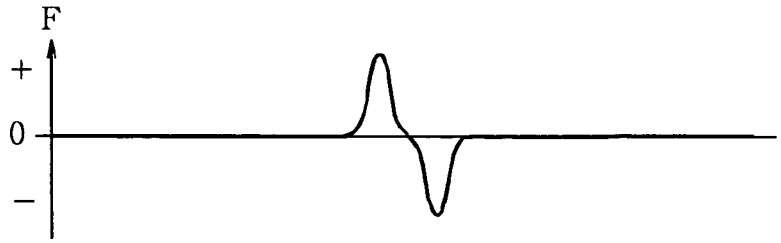
Figure 8C:
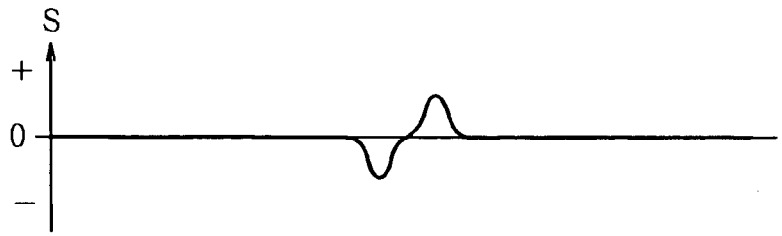
Figure 8D:
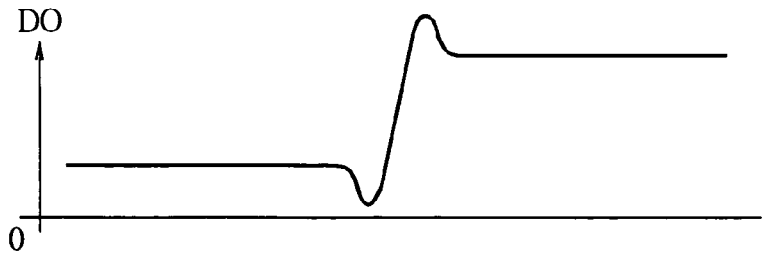

FIGS. 8(a) to 8(d) are graphs illustrating the edge enhancement process in the edge enhancer 5. FIG. 8(a) shows the image data Dz before edge enhancement; FIG. 8(b) shows the variation data F; FIG. 8(c) shows the enhancement values S; FIG. 8(d) shows the image data DO with an enhanced edge.

The edge detector 10 detects the variation data F shown in FIG. 8(b) by performing a differential calculation, such as taking the second derivative, on the image data Dz. The edge enhancement value generator 11 adjusts the amplitude of the variation data F, thereby generating the enhancement values S, which include an overshoot and an undershoot as shown in FIG. 8(c). The enhancement value adder 12 adds the enhancement value S shown in FIG. 8(c) to the front and rear of the edge in the image data Dz, thereby generating the image data DO with an enhanced edge.

FIGS. 9(a) to 9(e) are graphs illustrating the image processing operation of the image processor 1.

Figure 9A:
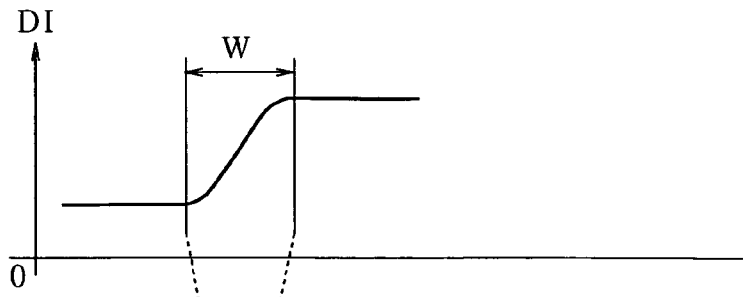
FIGS. 9(a) to 9(e) are graphs illustrating the operation of the image processing apparatus according to the present invention.
Figure 9B:
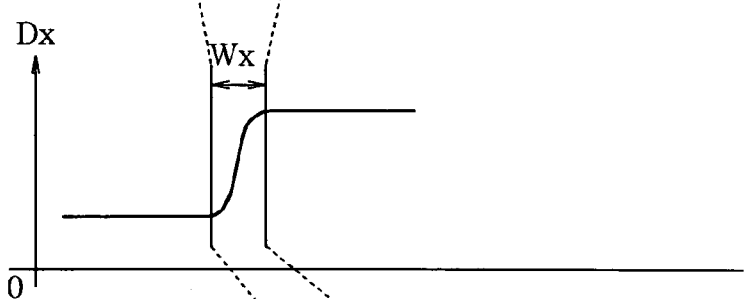
Figure 9C:
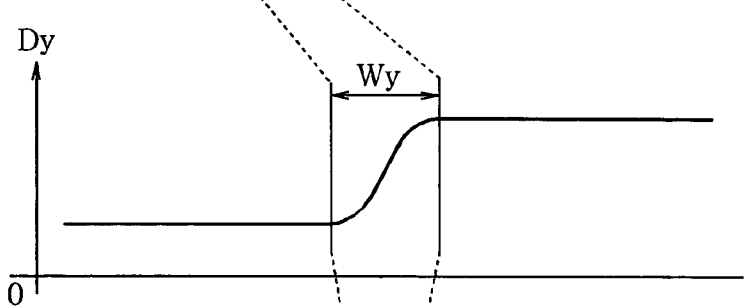
Figure 9D:
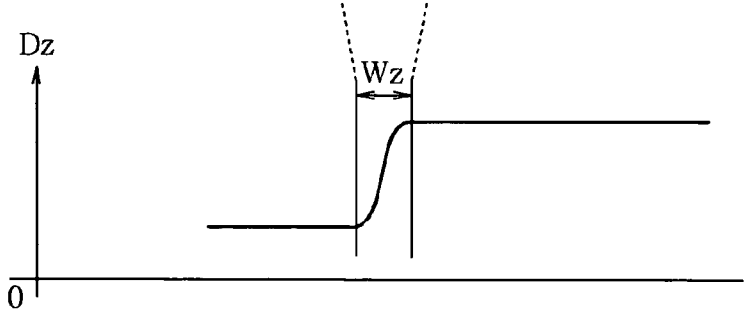
Figure 9E:
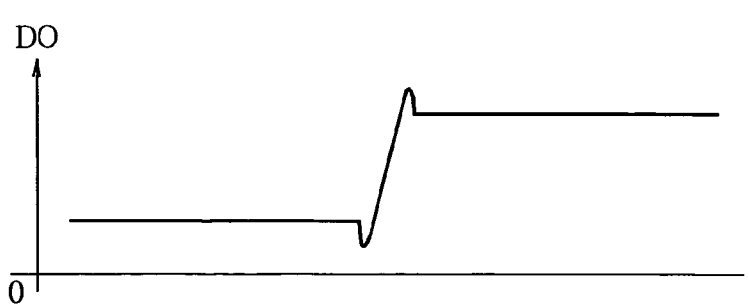

FIG. 9(a) shows the image data DI input to the image processor 1; FIG. 9(b) shows the image data Dx output from the first edge width corrector 2; FIG. 9(c) shows the image data Dy output from the enlargement processor 3; FIG. 9(d) shows the image data Dz output from the second edge width corrector 4; FIG. 9(e) shows the image data DO output from the edge enhancer 5.

Although the edge width W in the image data DI is reduced to the edge width Wx shown in FIG. 9(b) by the first edge width corrector 2, the reduced edge width Wx is enlarged by the enlargement process on the image in the enlargement processor 3 to become the edge width Wy shown in FIG. 9(c). Since the second edge width corrector 4 carries out the edge width correction process on the enlarged image data Dy output from the enlargement processor 3, the enlarged edge width Wy is reduced to the edge width Wz shown in FIG. 9(d). The edge enhancer 5 carries out the edge enhancement process on the image data Dz output from the second edge width corrector 4, thereby additionally enhancing the edge with the reduced width as shown in FIG. 9(e).

As described above, since the first edge width corrector 2 in the image processor 1 reduces the edge widths in an image before enlargement of the image, and the second edge width corrector 4 reduces the edge widths for a second time after the enlargement, the image processor 1 can enlarge the image without the blurring that occurs due to the enlargement of edge widths.

The effects of using the first and second edge width correctors 2, 4 to reduce edge widths will be described below.

Figure 10A:
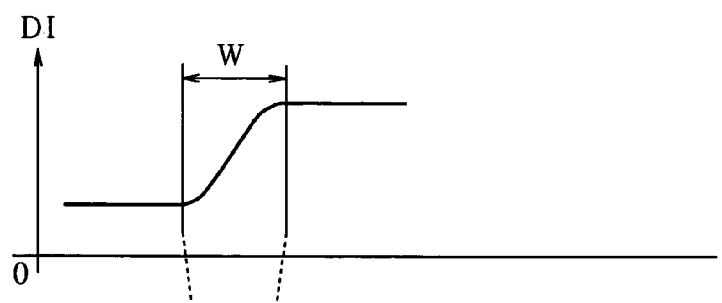
FIGS. 10(a) to 10(d) are graphs illustrating effects of the image processing apparatus according to the present invention.
Figure 10B:
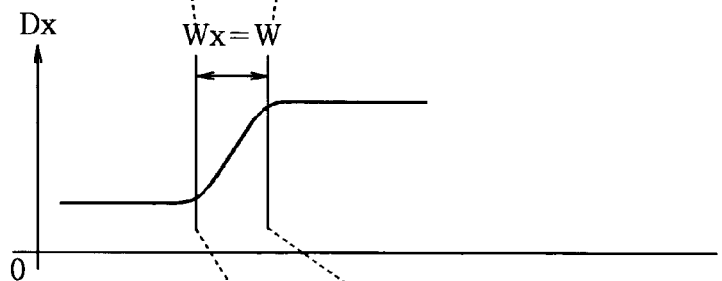
Figure 10C:
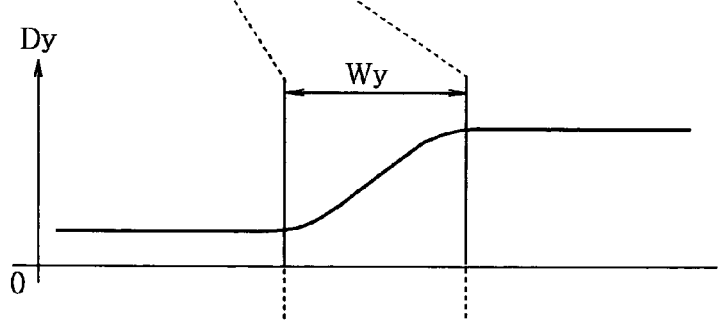
Figure 10D:
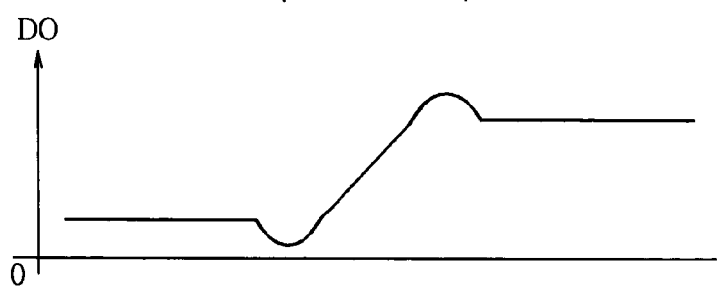

FIGS. 10(a) to 10(d) are graphs illustrating the problem that would arise if only the first edge width corrector 2 was used to correct edge widths. FIG. 10(a) shows the image data DI; FIG. 10(b) shows the image data Dx output from the first edge width corrector 2; FIG. 10(c) shows the image data Dy output from the enlargement processor 3; FIG. 10(d) shows the image data DO output from the edge enhancer 5.

If the second edge width corrector 4 was not used, no edge width correction process would be performed on the enlarged image data Dy output from the enlargement processor 3, so the image data Dy with the enlarged edge width Wy shown in FIG. 10(c) would be input to the edge enhancer 5. If the edge enhancement process was performed on the image data with enlarged edge widths as described above, because the widths of the overshoot and undershoot would be enlarged as shown in FIG. 10(d), edge sharpness could not be sufficiently improved.

Figure 11A:
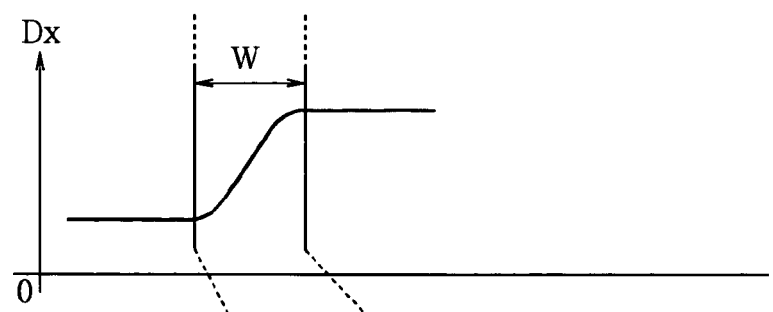
FIGS. 11(a) and 11(b) are graphs illustrating effects of the image processing apparatus according to the present invention.
Figure 11B:
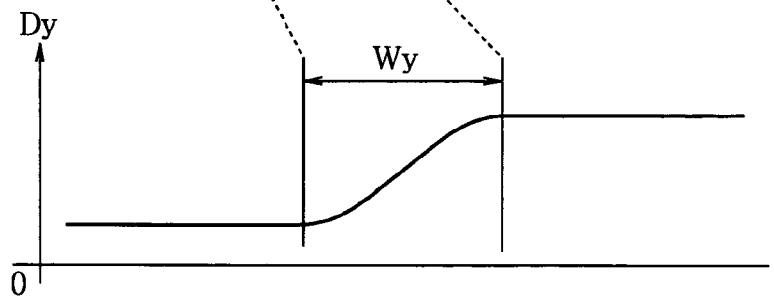

FIGS. 11(a) and 11(b) are graphs illustrating the problem that would arise if only the second edge width corrector 4 was used to correct edge widths. FIG. 11(a) shows the image data DI; FIG. 11(b) shows the image data Dy output from the enlargement processor 3.

If the first edge width corrector 2 was not used, the edge width Wy in the image data Dy output from the enlargement processor 3 would become greater than the edge width Wy in FIG. 9 (c). Accordingly, because the edge width correction process would have to be performed with the increased edge width Wy in the second edge width corrector 4, the amount of pixel data that would have to be used for detecting edge widths would increase. The resulting problem is that the circuit size of the edge width detector 6 would increase.

Since the image processor 1 carries out the edge width correction process shown in FIG. 9(b) that reduces edge widths in the image data DI before the enlargement process shown in FIG. 9(c) is carried out on the image, and the second edge width correction process shown in FIG. 9(d) is carried out on the image data after the enlargement process, even if a comparatively high enlargement ratio is used, edge sharpness can be adequately maintained in the enlarged image. Since the edge width enhancement process shown in FIG. 9(e) is performed on image data Dz with reduced edge widths, the overshoot and undershoot added by this process have comparatively small widths, so edge sharpness can be adequately improved.

In the image processor 1 according to the present invention, since the corrected values of edge widths are determined not according to the amplitude values of edges but according to the sizes of the edge widths, sharpness even at edges having small amplitudes and large widths can be improved, and an appropriate edge enhancement process can be performed.

The edge enhancer 5 may be adapted so as not to enhance noise components, and may also include a noise reduction function that reduces noise components. This can be done by having the edge enhancement value generator 11 perform a nonlinear process on the variation data F detected by the edge detector 10. The variation data F may be detected by performing pattern matching or other calculations instead of by a differential calculation.

Figure 12:
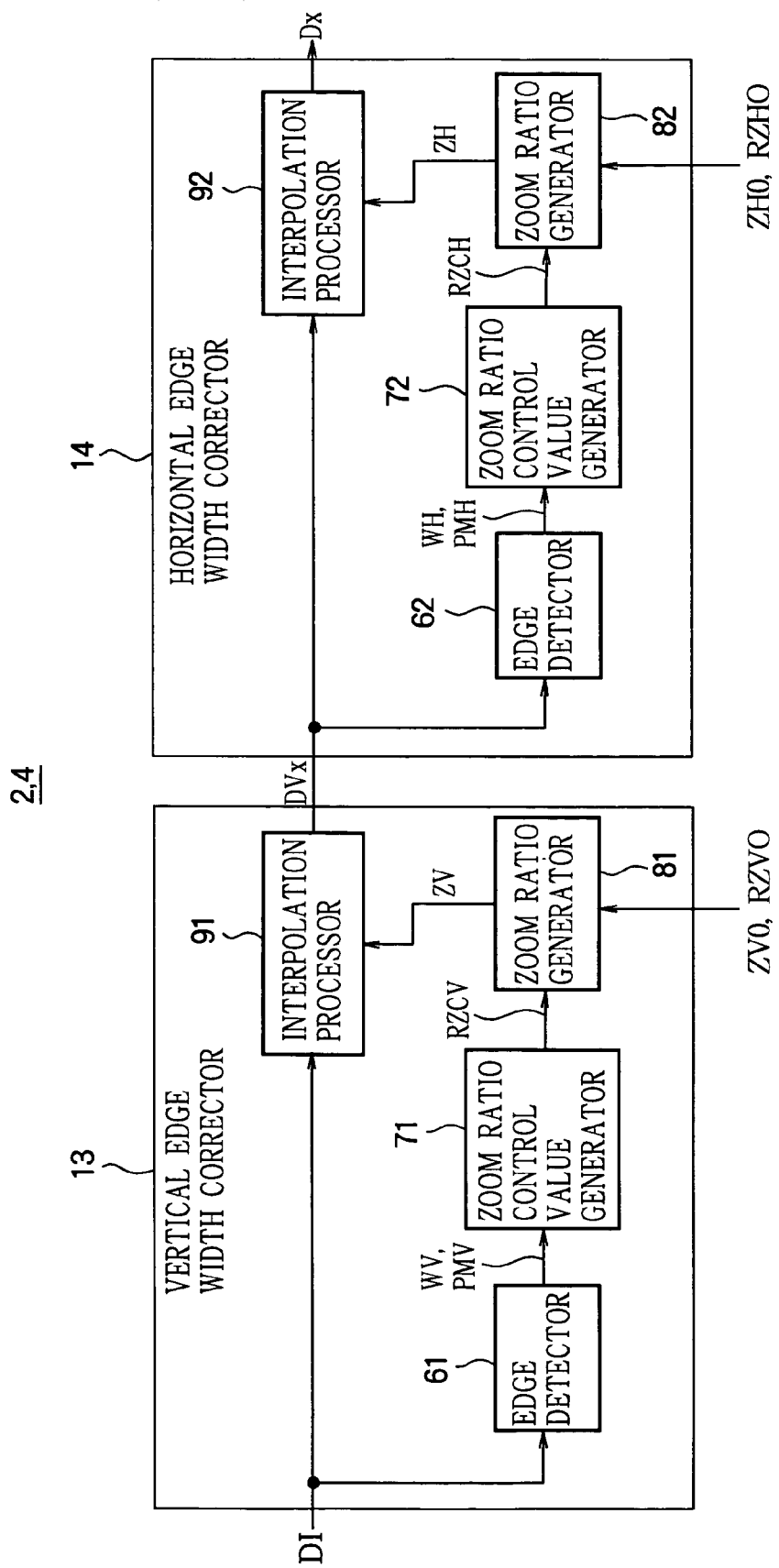
FIG. 12 is a block diagram showing the structure of the first and second edge width correctors.

FIG. 12 is a block diagram showing an alternative structure of the first and second edge width correctors 2, 4.

The first and second edge width correctors 2, 4 in FIG. 12 each comprise a vertical edge width corrector 13 for correcting edge widths in the vertical direction and a horizontal edge width corrector 14 for correcting edge widths in the horizontal direction.

The vertical edge width corrector 13 and the horizontal edge width corrector 14 have the same internal structure as in FIG. 3, and perform the edge width correction process described above on edges in the vertical and horizontal directions in the image data DI, respectively.

In the vertical edge width corrector 13, the edge detector 61 detects vertical edge widths WV and vertical reference positions PMV in the image data DI, and the zoom ratio control value generator 71 generates vertical zoom ratio control values RZCV. The zoom ratio generator 81 generates a vertical zoom conversion ratio ZV, and the interpolation processor 91 carries out the interpolation calculation process in the vertical direction on the image data DI according to the zoom conversion ratio ZV, generating image data DVx with edge widths corrected in the vertical direction.

In the horizontal edge width corrector 14, the edge detector 62 detects horizontal edge widths WH and horizontal reference positions PMH in the image data DVx, and the zoom ratio control value generator 72 generates horizontal zoom ratio control values RZCH. The zoom ratio generator 82 generates a horizontal zoom conversion ratio ZH, and the interpolation processor 92 carries out the interpolation calculation process in the horizontal direction on the image data DVx according to the zoom conversion ratio ZH, generating image data Dx with edge widths corrected in the vertical and horizontal directions.

The edge width correction process in the vertical direction may be performed after the edge width correction process in the horizontal direction, or the edge width correction processes in the horizontal and vertical directions may be performed simultaneously.

If the horizontal reference zoom conversion ratio information is equal to unity (RZHO=1), and the vertical reference zoom conversion ratio information is equal to unity (RZVO=1), the image as a whole is neither enlarged nor reduced; only the edge width correction process is performed.

Figure 13:
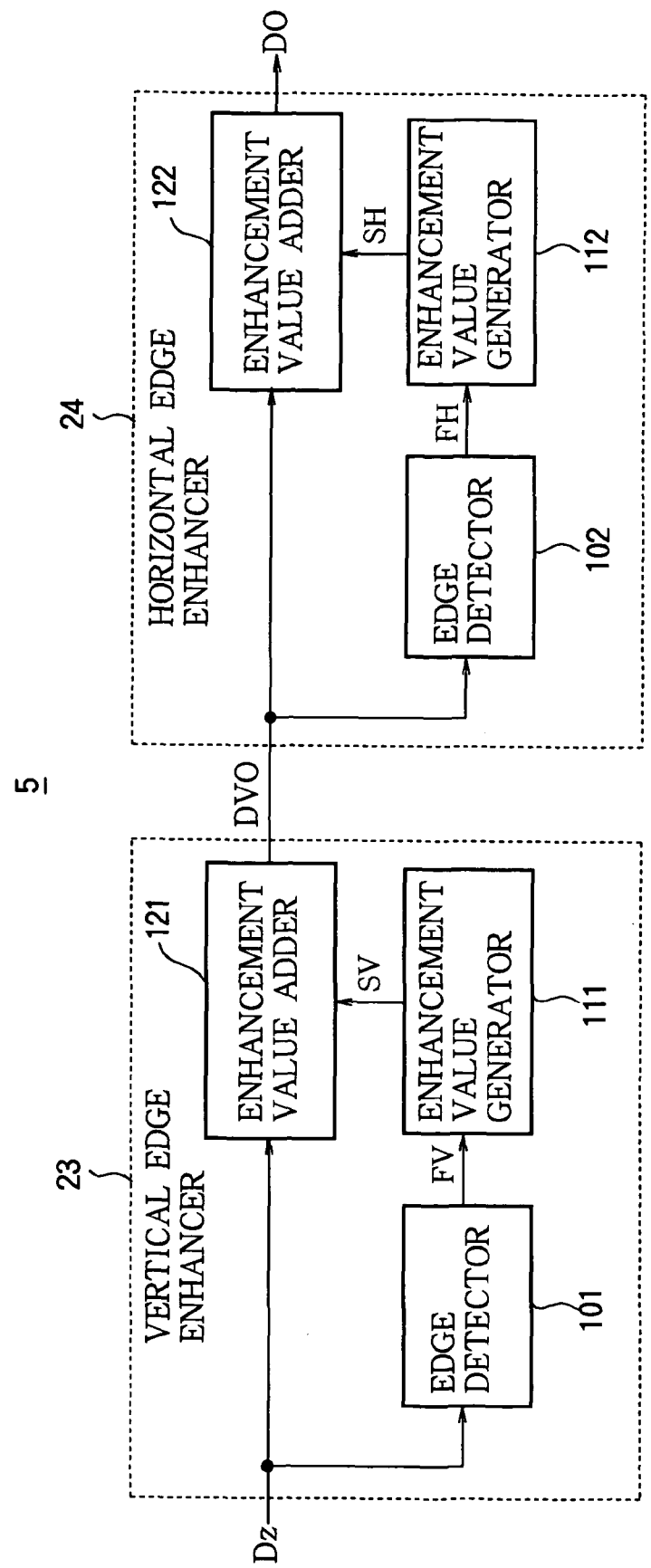
FIG. 13 is a block diagram showing the structure of the edge enhancer.

FIG. 13 is a block diagram showing an alternative structure of the edge enhancer 5.

The edge enhancer 5 in FIG. 13 comprises a vertical edge enhancer 23 for enhancing edges in the vertical direction and a horizontal edge enhancer 24 for enhancing edges in the horizontal direction.

The vertical edge enhancer 23 and the horizontal edge enhancer 24 have the same internal structure as in FIG. 7, and perform the edge enhancement process described above on edges in the vertical and horizontal directions, respectively, in the image data Dz output from the second edge width corrector 4.

In the vertical edge enhancer 23, the edge detector 101 detects vertical variation data FV indicating the variation of the image data across edges in the vertical direction in the image data Dz, and the enhancement value generator 111 generates vertical edge enhancement values SV. The enhancement value adder 121 adds the vertical edge enhancement values SV to the image data Dz, generating image data DV0 with edges enhanced in the vertical direction.

In the horizontal edge enhancer 24, the edge detector 102 detects horizontal variation data FH indicating the variation of the image data across edges in the horizontal direction in the image data DV0, and the enhancement value generator 112 generates horizontal edge enhancement values SH. The enhancement value adder 122 adds the horizontal edge enhancement values SH to the image data DV0, generating image data DO with edges enhanced in the vertical and horizontal directions.

An adequate improvement in image sharpness is obtained when the first and second edge width correctors 2, 4 shown in FIG. 12 and the edge enhancer 5 shown in FIG. 13 are used to perform the edge width correction process and the edge enhancement process on edges in the horizontal and vertical directions.

Figure 14:
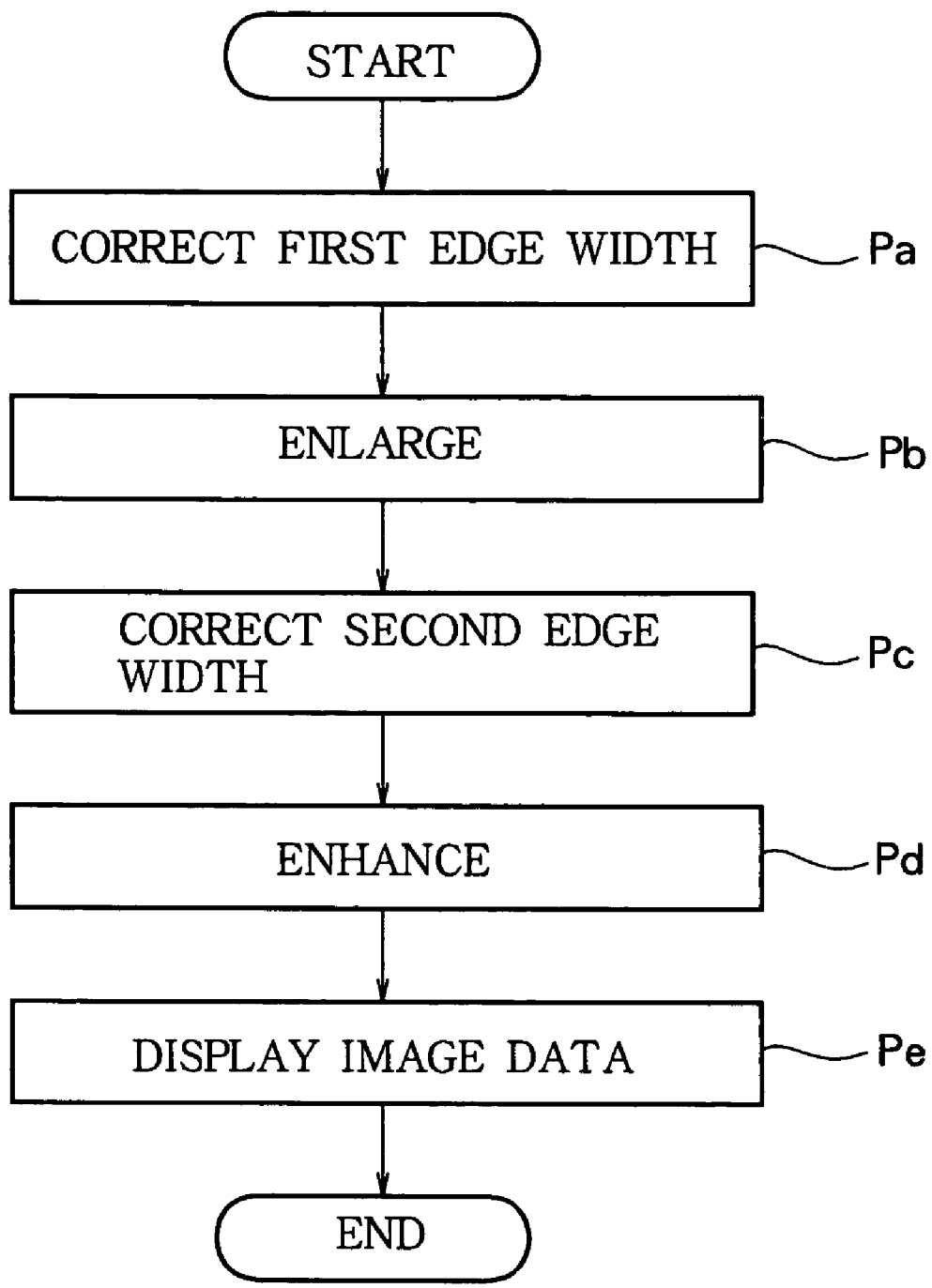
FIG. 14 is a flowchart illustrating the processing steps performed by the image processing apparatus according to the present invention.

FIG. 14 is a flowchart illustrating the processing steps in the image processing method according to the invention described above.

In step Pa, a first edge width correction process is performed on the input image data DI, generating image data Dx with edge widths corrected in the vertical and horizontal directions.

In step Pb, an enlargement process is carried out on the image in the image data with edge widths corrected in step Pa, generating enlarged image data Dy.

In step Pc, a second edge width correction process is carried out on the image data Dy enlarged in step Pb, generating image data Dz with edge widths corrected in the vertical and horizontal directions.

In step Pd, an edge enhancement process that adds overshoots and undershoots to edges in the vertical and horizontal directions in the image data with edge widths corrected in step Pc is performed, generating image data DO with enhanced edges.

Finally, in step Pe, the image with the enhanced edges is displayed.

Figure 15:
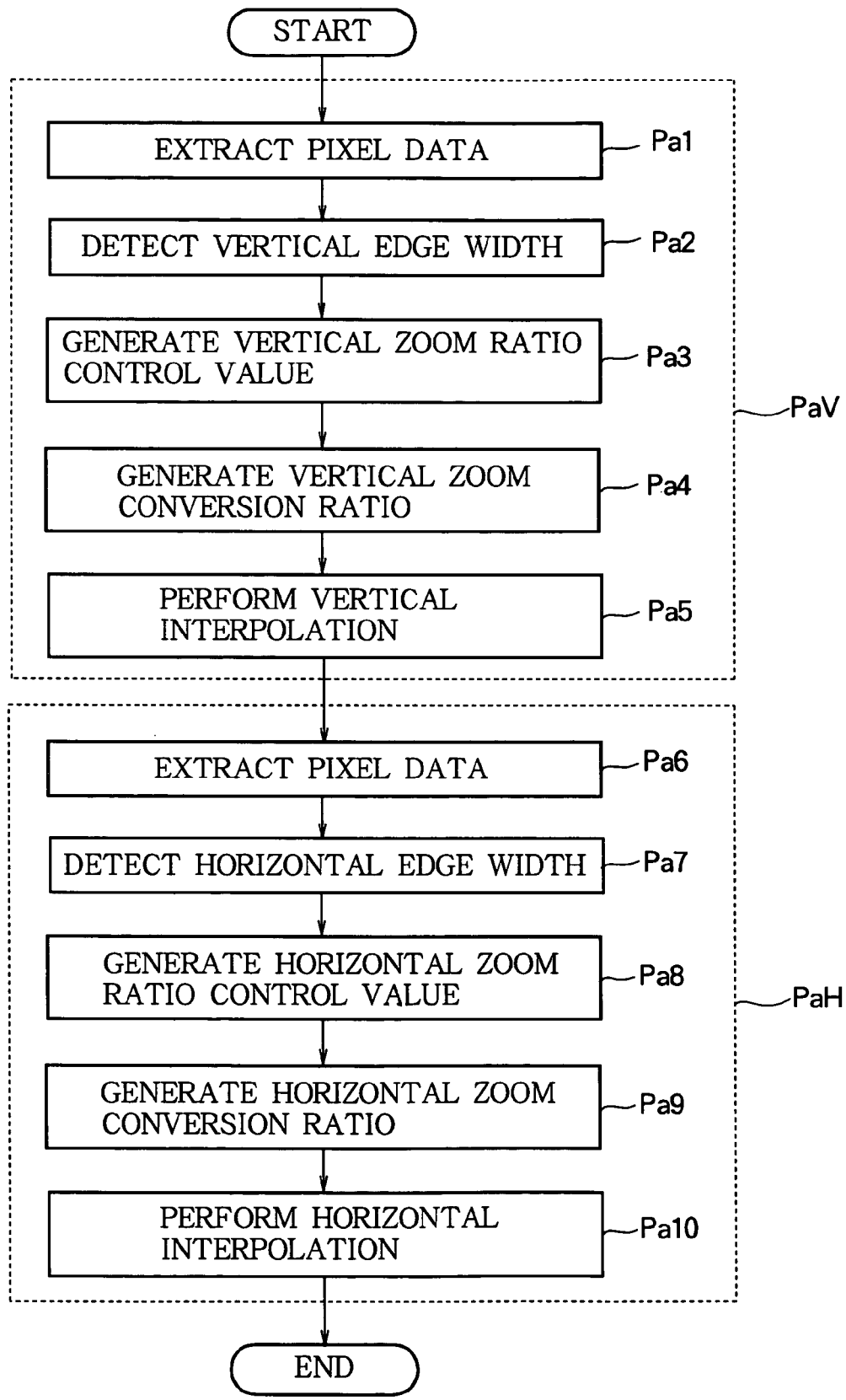
FIG. 15 is a flowchart illustrating the edge width correction steps performed by the image processing apparatus according to the present invention.

FIG. 15 is a flowchart illustrating the sub-steps in the first and second edge width correction steps Pa and Pc. PaV indicates a process that corrects edge widths in the vertical direction; PaH indicates a process that corrects edge widths in the horizontal direction.

In step Pa1, the data for a plurality of pixels necessary for interpolation and for detecting an edge width and reference position in the vertical direction are extracted from the input image data DI.

In step Pa2, a vertical edge width WV and vertical reference positions PMV are detected from the data for the plurality of pixels extracted in step Pa1.

In step Pa3, vertical zoom ratio control values RZCV are generated according to the data for the plurality of pixels extracted in step Pa1 and the vertical edge width and the vertical reference position detected in step Pa2.

In step Pa4, vertical zoom conversion ratio information is generated by superimposing the vertical zoom ratio control values generated in step Pa3 on given vertical reference zoom conversion ratio information RZV0, and vertical zoom conversion ratios ZV are generated by calculating the reciprocal of the vertical zoom conversion ratio information.

In step Pa5, a vertical interpolation process is performed on the data for the plurality of pixels extracted in step Pa1 according to the vertical zoom conversion ratio ZV generated in step Pa4.

The vertical edge width correction process PaV is completed when steps Pa1 to Pa5 have been performed on all of the pixels in image data DI.

When the vertical edge width correction process PaV is completed, the horizontal edge width correction process PaH starts.

In step Pa6, the data for a plurality of pixels necessary for interpolation and for detecting an edge width and reference position in the horizontal direction are extracted from the image data DVx with edge widths corrected in the vertical direction.

In step Pa7, a horizontal edge width WH and horizontal reference position PMH are detected from the data for the plurality of pixels extracted in step Pa6.

In step Pa8, horizontal zoom ratio control values RZCH are generated according to the data for the plurality of pixels extracted in step Pa6 and the horizontal edge width WH and the horizontal reference position PMH detected in step Pa7.

In step Pa9, horizontal zoom conversion ratio information is generated by superimposing the zoom ratio control values generated in step Pa8 on given horizontal reference zoom conversion ratio information RZH0, and horizontal zoom conversion ratios ZH are generated by calculating the reciprocal of the horizontal zoom conversion ratio information.

In step Pa10, a horizontal interpolation process is performed on the data for the plurality of pixels extracted in step Pa6 according to the zoom conversion ratios ZH generated in step Pa9.

The horizontal edge width correction process PaH is completed when steps Pa6 to Pa10 have been performed on all of the pixels in image data DVx.

Although the steps illustrated in FIG. 15 correct edge widths in both the vertical and horizontal directions, the edge widths may be corrected in only one of these two directions. More specifically, the steps in only one of the two processes PaV and PaH in FIG. 15 may be performed.

Although the edge width correction process in the horizontal direction is performed after the edge width correction process in the vertical direction in the processing steps in FIG. 15, the edge width correction process in the vertical direction may be performed after the edge width correction process in the horizontal direction. More specifically, the steps in process PaV in FIG. 15 may be performed after the steps in process PaH in FIG. 15.

Figure 16:
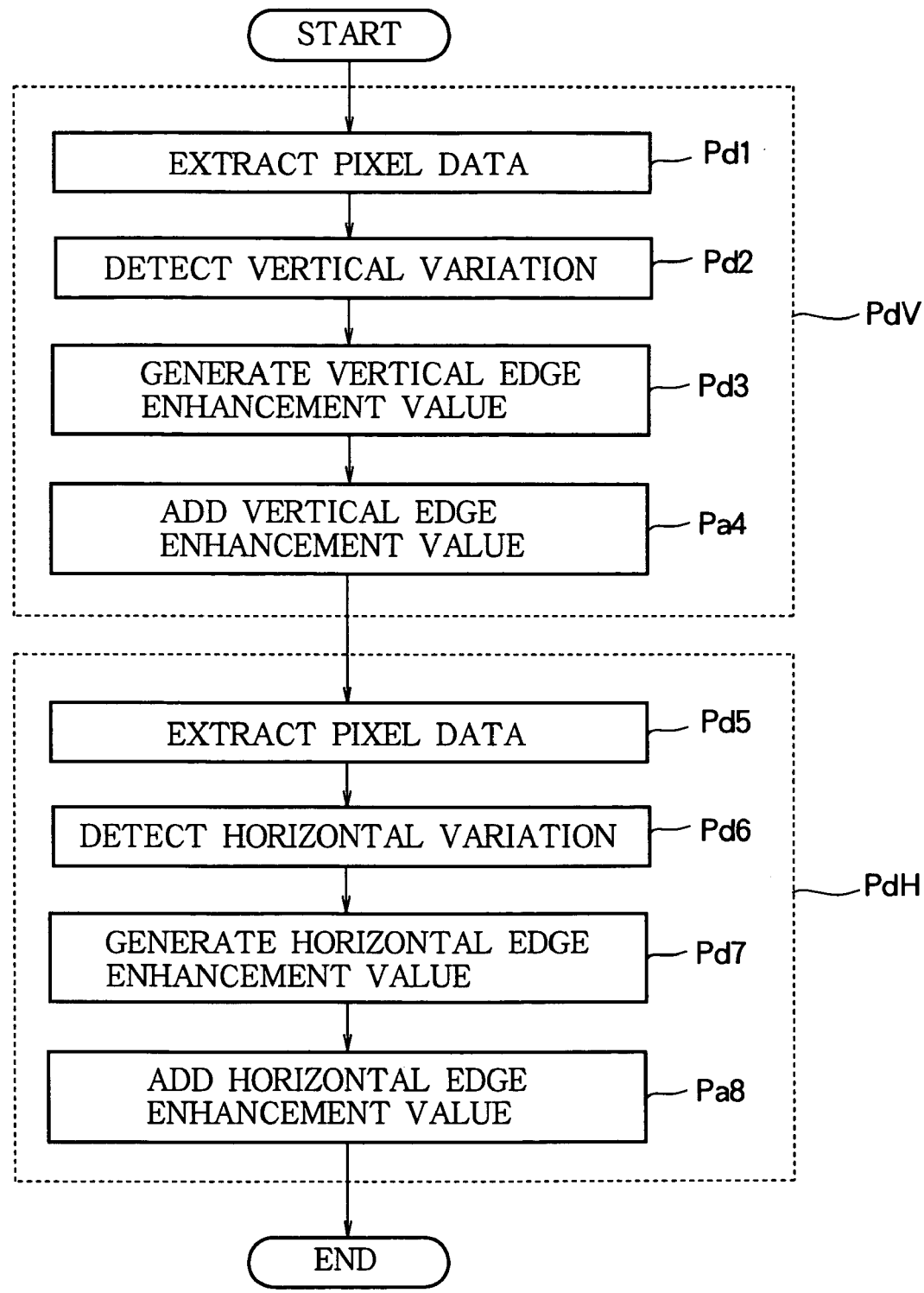
FIG. 16 is a flowchart illustrating edge enhancement steps performed by the image processing apparatus according to the present invention.

FIG. 16 is a flowchart illustrating the sub-steps in the edge enhancement step Pd. PdV indicates a process that enhances edges in the vertical direction; PdH indicates a process that enhances edges in the horizontal direction.

In step Pd1, the data for a plurality of pixels necessary for detecting the variation of the image data across an edge in the vertical direction are extracted from the image data Dz with corrected edge widths.

In step Pd2, the vertical variation data FV indicating the variation of the image data across an edge in the vertical direction are generated from the data for the plurality of pixels extracted in step Pd1.

In step Pd3, vertical edge enhancement values SV are generated according to the variation data FV generated in step Pd2.

In step Pd4, the vertical edge enhancement values generated in step Pd3 are added to the data for the pixels extracted in step Pd1.

The vertical edge enhancement process PdV is completed when steps Pd1 to Pd4 have been performed on all of the pixels in the image data.

In step Pd5, the data for a plurality of pixels necessary for detecting the variation of the image data across an edge in the horizontal direction are extracted from the image data DV0 with edges enhanced in the vertical direction.

In step Pd6, horizontal variation data FH indicating the variation of the image data across an edge in the horizontal direction are generated from the data for the plurality of pixels extracted in step Pd5.

In step Pd7, horizontal edge enhancement values SH are generated according to the variation data FH generated in step Pd6.

In step Pd8, the horizontal edge enhancement values generated in step Pd7 are added to the data for the pixels extracted in step Pd5.

The horizontal edge enhancement process PdH is completed when steps Pd5 to Pd8 have been performed on all of the pixels in image data DV0.

The image processing method according to the present invention described above with reference to the flowcharts in FIGS. 14 to 16 can be practiced by using software (or using software and hardware).

What is claimed is:

1. An image processing apparatus comprising:
    a first edge width corrector for detecting edges in image data, generating first zoom ratio control values according to edge widths of the detected edges, and carrying out an interpolation calculation process on the image data according to the first zoom ratio control values, thereby correcting the edge widths;
    an enlargement processor for carrying out an enlargement process on the image data with edge widths corrected by the first edge width corrector in both the vertical and horizontal directions with respect to the image data;
    a second edge width corrector for detecting edges in the image data enlarged in the vertical and horizontal directions by the enlargement processor, generating second zoom ratio control values according to edge widths of the detected edges, and carrying out an interpolation calculation process on the enlarged image data according to the second zoom ratio control values, thereby correcting the edge widths; and
    an edge enhancer for detecting high frequency components of the image data with edge widths corrected by the second edge width corrector, calculating enhancement values for enhancing the edges according to the detected high frequency components, and adding the enhancement values to the image data with edge widths corrected by the second edge width corrector, thereby enhancing the edges.

2. The image processing apparatus of claim 1, wherein the first edge width corrector and the second edge width corrector generate said zoom ratio control values by generating negative values in a front part of each edge, positive values in a central part of the edge, and negative values in a rear part of the edge, the generated values summing to zero overall, generate a zoom conversion ratio by superimposing the zoom ratio control values on a reference zoom conversion ratio indicating an enlargement ratio or a reduction ratio of the image data, and carry out an interpolation process according to the zoom conversion ratio.

3. An image display apparatus comprising the image processing apparatus of claim 1.

4. An image processing method comprising:
    a first edge width correction step for detecting edges in image data, generating first zoom ratio control values according to edge widths of the detected edges, and carrying out an interpolation calculation process on the image data according to the first zoom ratio control values, thereby correcting the edge widths;
    an enlargement processing step for carrying out an enlargement process on the image data with edge widths corrected by the first edge width correction step in both the vertical and horizontal directions with respect to the image data;
    a second edge width correction step for detecting edges in the image data enlarged by the enlargement processing step, generating second zoom ratio control values according to edge widths of the detected edges, and carrying out an interpolation calculation process on the enlarged image data according to the second zoom ratio control values, thereby correcting the edge widths; and an edge enhancement step for detecting high frequency components of the image data with edge widths corrected by the second edge width correction step, calculating enhancement values for enhancing the edges according to the detected high frequency components, and adding the enhancement values to the image data with edge widths corrected by the second edge width correction step, thereby enhancing the edges.

5. The image processing method of claim 4, wherein the first edge width correction step and the second edge width correction step generate said zoom ratio control values so that their values are negative in a front part of each edge, positive in a central part of the edge, and negative in a rear part of the edge, and sum to zero overall, generate a zoom conversion ratio by superimposing the zoom ratio control values on a reference zoom conversion ratio indicating an enlargement ratio or a reduction ratio of the image data, and carry out an interpolation process according to the zoom conversion ratio.

6. The image processing method of claim 4, wherein the method is carried out by a computer processor.

* * * * *